Jan. 31, 1961

J. B. HOBART, JR 2,969,941

AIR DUCT SCREEN WITH LOCKING DEVICE

Filed Nov. 4, 1959

INVENTOR.
JOE B. HOBART JR.

BY
ATTORNEYS

Jan. 31, 1961   J. B. HOBART, JR   2,969,941
AIR DUCT SCREEN WITH LOCKING DEVICE
Filed Nov. 4, 1959   2 Sheets-Sheet 2

INVENTOR.
JOE B. HOBART JR.
BY
ATTORNEYS

United States Patent Office 2,969,941
Patented Jan. 31, 1961

2,969,941

AIR DUCT SCREEN WITH LOCKING DEVICE

Joe B. Hobart, Jr., Greenville, Miss., assignor, by mesne assignments, to the United States of America as represented by the Secretary of the Navy Filed Nov. 4, 1959, Ser. No. 850,976

8 Claims. (Cl. 244—53)

The present invention relates in general to aircraft, and more particularly to a protective screen for preventing foreign matter from being drawn into the air intake of a jet engine during ground operation thereof.

When an engine of a turbojet aircraft is being tested under static conditions, there is a danger that small objects such as sticks and pebbles may be sucked from the surface of the testing area into the air intake ducts. This loose debris is liable to damage the blades of the compressor as well as other parts of the engine. If the damage remains unnoticed until after the craft is airborne, the engine may lose power, or, in extreme cases, a flame-out or stall may result.

It has previously been proposed to place a screen over each engine air intake opening, but such screening devices have invariably been complex in construction and not readily demountable when their purpose has been served. In many instances, they have been designed not only for ground operations but for additional utilization during actual flight to preclude the interception of birds, or even during combat to avoid picking up parts of disintegrating aircraft. Consequently, the screens are frequently formed to fit integrally within the wing structure or within the fuselage itself, depending upon engine location. When such structures are needed only during warm-up or for testing purposes, excessive time and effort is required for their installation and subsequent removal.

It is accordingly a principal objective of the present invention to provide an assembly which efficiently serves to screen a jet engine air intake, and which at the same time is readily attached and removed by the mere manipulation of a pair of fasteners.

It is a further object of the invention to provide a jet engine air intake screen in the form of a series of tubular foundation members disposed to be essentially concentric with the rim of the air intake opening and spaced apart by further foundation members aligned generally transverse thereto. The structure thus formed defines in general the surface of a paraboloid which, when covered by screening of appropriate mesh and secured to the air intake rim, acts to seal the opening from any foreign matter which may be drawn to the screen surface.

It is a still further object of the invention to provide a simple and efficient fastener which is particularly adapted for quickly and easily securing a screen of the type described to a jet engine air intake opening, and which requires only a minimum of manipulation when detachment of such screen is desired.

It is an additional object of the invention to provide a jet engine air intake screen which may be attached to, or disengaged from, an aircraft by a single mechanic, and which in addition is structurally designed to be highly resistant to bending or breakage under normal aircraft servicing conditions or during flight warm-up operations.

Other objects and many of the attendant advantages of this invention will be readily appreciated as the same becomes better understood by reference to the following detailed description when considered in connection with the accompanying drawings wherein.

Figure 1:
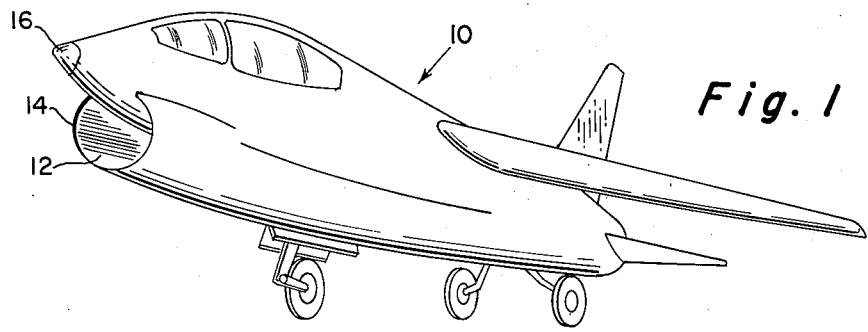
Fig. 1 is a perspective view in outline of an aircraft having a jet engine air intake duct of the type with which the present invention is to be employed.

Referring now to Fig. 1, there is illustrated in outline an aircraft 10 of the jet type. The particular aircraft shown is propelled by a single jet engine to which air is supplied through a forwardly-opening intake duct or inlet 12 having a rim portion 14. The walls of the intake duct 12 form part of the fuselage of the aircraft, with the rim 14 being located below and slightly aft of the radome 16. As the present description proceeds, however, it will be recognized that the invention is not limited to turbojet aircraft propelled by a single power unit, but is capable of utilization with many different types of multiengine arrangements and designs. In every instance, it is only necessary that one screen assembly embodying the concepts herein disclosed be employed in conjunction with the air intake duct of each jet engine for which protection is desired.

In the example chosen for illustration, the rim 14 is of semi-circular configuration, the air intake duct 12 itself being generally tubular and having an axis extending in a longitudinal direction approximately parallel to the fore-and-aft axis of the aircraft 10. The protective screen of the present invention is designed to cover the opening of the air intake duct 12, fitting securely around the rim 14 and against that portion of the aircraft fuselage which lies in the vicinity thereof, thereby preventing foreign objects from being drawn into the air duct when the engine of the aircraft is ground-operated in areas where such foreign objects may be present.

Figure 2:
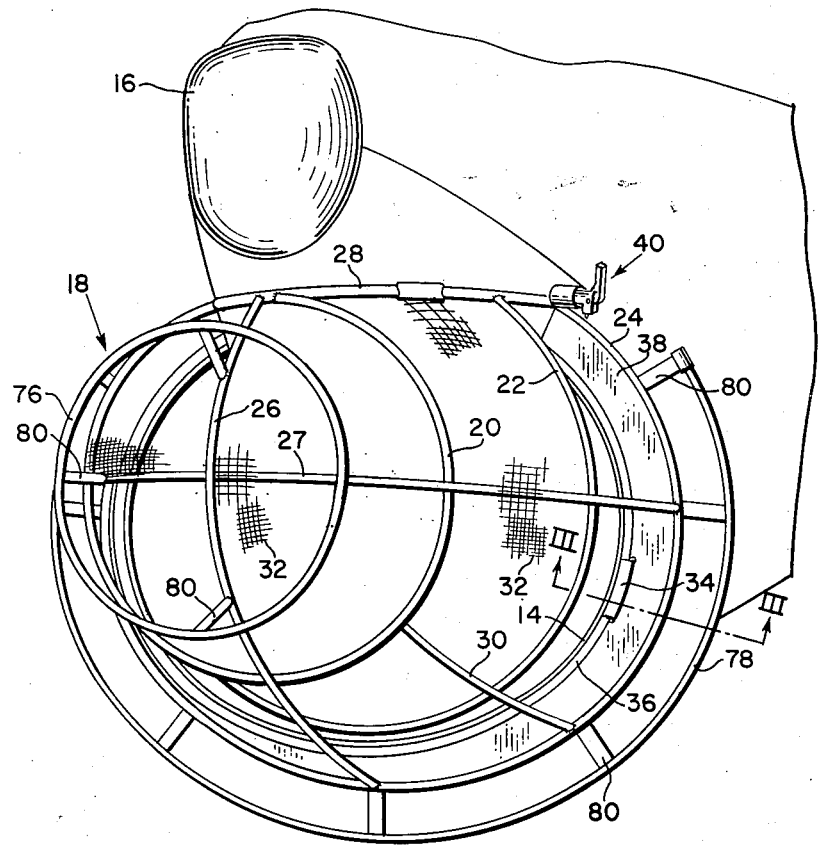
Fig. 2 is an enlarged perspective view of a protective screen designed in accordance with a preferred embodiment of the present invention, the screen being partly broken away to more clearly show the manner in which the assembly is fitted over the intake duct of the aircraft of Fig. 1.

A preferred form of protective screen assembly designed to accomplish the above objectives is illustrated in Fig. 2. This assembly includes a skeletal framework in the form of a cage designed to fit over the semi-circular rim 14 of the tubular air duct 12. This cage, the component parts of which are collectively identified in the drawing by the reference numeral 18, roughly outlines a paraboloid the axis of which generally coincides with the longitudinal axis of the air intake duct 12. Cage 18 is made up of a plurality of annular structural members 20, 22, 24, the respective diameters of which increase from the front to the rear of the assembly as viewed in Fig. 2. The structural members 20, 22 and 24 are disposed in spaced-apart relation concentrically about the longitudinal axis of the cage or framework, with member 24 overlying, but being spaced apart from, the rim 14 of the air duct 12 when cage 18 is in the fitted position illustrated.

Additional structural members 26 and 27 are disposed to angularly intersect the members 20, 22, and 24. These members 26, 27 are in general parabolically shaped, and lie essentially normal to one another in the plane of the said longitudinal axis. They also intersect the annular members 20, 22, and 24 at right angles, each of the members 26 and 27 terminating at its point or points of contact with structural member 24. A portion of the cage assembly 18 is cut away to permit it to be located beneath the radome 16 in the manner illustrated, a still further structural member 28 being utilized which is contoured to fit the radome surface. This member 28 is roughly parabolic in shape, and lies generally in a horizontal plane so as to intersect each of the annular members 20, 22 and 24. Structural member 26 also intersects member 28 at the point where the latter is secured to member 20. All of the structural members 20 through 28 are welded together or otherwise securely joined to one another at each point of intersection to form a rigid cage assembly. If desired, additional structural members may be added to strengthen the cage unit. One such member is illustrated in the drawing and identified by the reference numeral 30.

Covering the skeletal framework formed by the structural members 20 through 30 is a wire screen 32 having a mesh chosen so as to intercept whatever debris and foreign matter may be present in the region where the invention device is to be utilized. This screen 32 is attached at a plurality of points to the structural members by some preferred method such as welding, and, if only relatively small sections of screen are available, the various portions may be fitted together so as to slightly overlap. In any case, the structural members support the screen so that, in the example being described, the assembly possesses the general contour set forth in the drawing. It will be understood that alternatively a screen of coarse mesh may first be welded to the framework, and then a second fine-mesh screen laid down thereover. This has the additional advantage of increasing the rigidity of the assembly.

Figure 3:
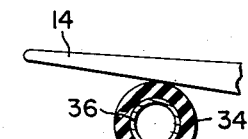
Fig. 3 is a sectional view of a portion of Fig. 2 taken along the line 3—3.

When the cage 18 is fitted over the rim 14 of the engine air duct, annular member 24, which has a diameter greater than the diameter of the rim, is spaced apart therefrom as best shown in Fig. 3. To align the cage, and to establish a seal between it and the air intake duct surface, a resilient member 34 in the form of a tube is employed, this flexible member encircling a further tube 36 of rigid material which is disposed in annular fashion to be concentric with, and of smaller diameter than, the annular structural member 24. The elements 34–36 are joined to the cage structure by means of a metallic disc 38 which is welded as best shown in Fig. 3 both to the structural member 24 and to the rigid tube 36, the disc 38 projecting inwardly from the surface of the cage assembly and extending essentially radially with respect to the longitudinal axis thereof. When the cage is in fitted position, the flexible tube 34 makes contact with the outer surface of the air duct rim 14, as best shown in Fig. 3, the characteristics of the flexible material of which tube 34 is composed being such as to preclude damage to the aircraft fuselage which might be caused by contact of a metallic object such as tube 36 therewith.

To complete the sealing process, structural member 28 which lies against the surface of the aircraft fuselage beneath the radome 16, is covered with resilient material, preferably of a spongy nature, which is compressed when the protective unit is in place over intake duct. This expedient ensures that all air which enters the duct passes through screen 32, and, consequently, that foreign matter of a size greater than the distance between adjacent wires of the screen is removed therefrom.

Figure 4:
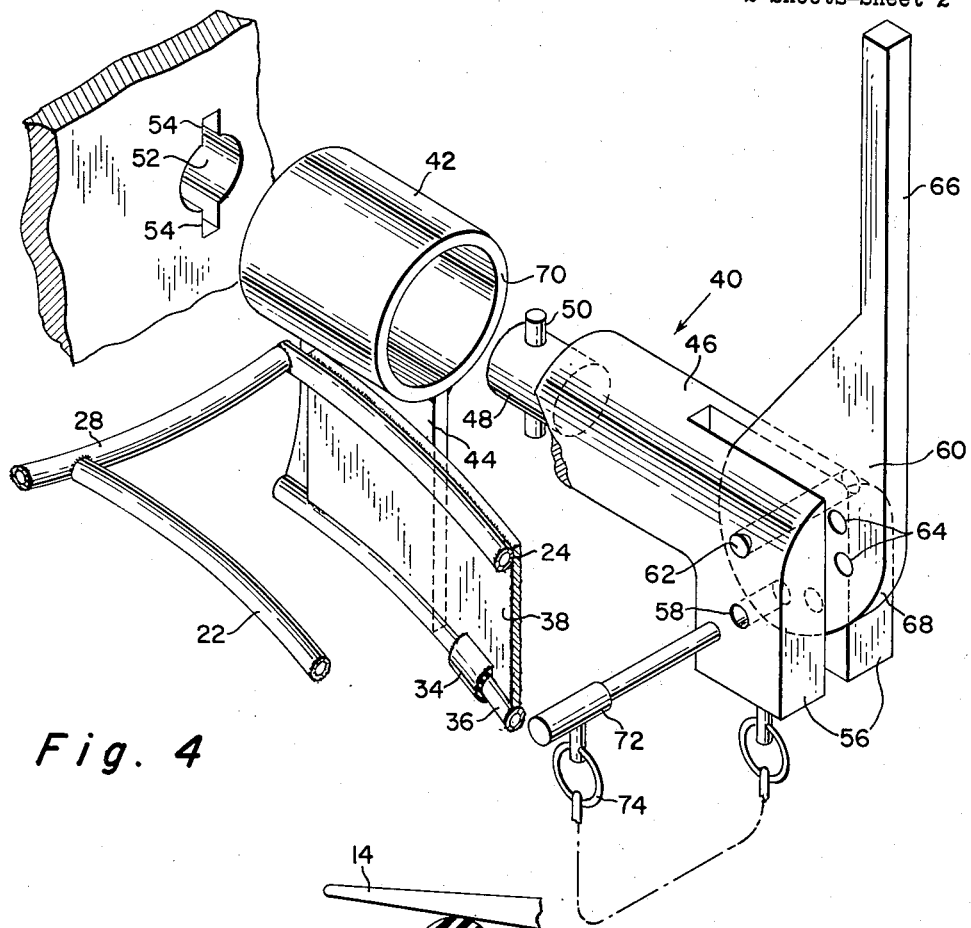
Fig. 4 is a detailed perspective view of one of the fastening members by which the protective screen of Fig. 2 is secured to the body of the aircraft after it is fitted over the rim of the intake duct.

When the cage assembly has been manually positioned so as to cover the opening of the air intake duct, it is locked in such position by means of a pair of symmetrically-disposed fastening devices 40, only one of which is visible in Fig. 2 of the drawings due to the manner of taking the perspective view. Each such fastening device, shown in detail in Fig. 4, includes a tubular sleeve 42 which is rigidly secured, as by welding, to a bracket 44 mounted on the structural member 24 at the point where the latter intersects te structural member 28. The axis of the tubular sleeve 42 lies in the plane of member 24 and also essentially normal to the surface of the aircraft fuselage in the vicinity of the air duct opening. Slidably carried within the tubular sleeve 42 is a cylinder 46 one end portion 48 of which is of reduced diameter and carries a pin 50 extending radially in both directions from the cylinder surface. This pin 50 acts as a key when the fastening device 40 is operated in a manner now to be described.

Associated with each fastening device 40, when cage 18 is in fitted position, is a socket having an opening 52 formed in the fuselage of aircraft 10 and axially aligned with the cylinder 46. This opening 52 is provided with a pair of oppositely-disposed slots 54 adapted to receive the two radially-projecting ends of pin 50 when the end portion 48 of cylinder 46 is inserted in the fuselage opening.

The end of cylinder 46 opposite to that which carries the pin 50 is bifurcated, and in addition is provided with a pair of laterally-extending flanged portions 56 having a common transverse aperture 58 formed therein. These flanged portions 56 are disposed in spaced-apart parallel relation so as to accommodate therebetween a cammed lever 60 which is pivoted thereto at 62. The latter has a plurality of angularly-spaced openings 64 formed therein, any one of which may be selectively aligned with the aperture 58 when the lever is pivoted about point 62 through manual manipulation of a handle 66.

When it is desired to lock the protective screen assembly in place following a positioning thereof, the end portion 48 of cylinder 46 is inserted in the opening 52 of the socket in the aircraft fuselage so that pin 50 passes through the slots 54. The entire assembly of which cylinder 46 forms a part is then turned through an angle of approximately 90°, following which the handle 66 is manually operated to pivot the cammed lever 60 about point 62. This causes the cam surface 68 to engage the end portion 70 of sleeve 42, and, as a result, the cylinder 46 moves axially outwardly in the sleeve. Since the socket in the aircraft fuselage is preferably of the spring-loaded type, such an outward axial movement of the cylinder 46 compresses the cage assembly 18 inwardly against the rim 14 of the air intake opening 12, and consequently forces the flexible member 34, as well as the resilient material covering the structural member 28, tightly against the aircraft fuselage.

When the handle 66 has been manually actuated about pivot point 62 to a position where a lockable condition has been established, the nearest one of the openings 64 in the cammed lever 60 is aligned with the aperture 58 in the flanged portions 56. A locking pin 72, attached to handle 66 by a chain 74, is then inserted in the openings thus aligned to maintain the fastening assembly in the particular position selected.

To facilitate handling the cage 18 during installation on, or removal from, the aircraft, a pair of guard rails 76 and 78 are respectively provided at the front and rear of the unit as viewed in Fig. 2. These guard rails lie exterior of the screen surface, as shown, and are secured to the structuarl members 26, 27 and 24 by means of a plurality of outwardly-projecting tabs 80 welded both to the guard rails and to the structural members. In addition to providing a handle which may readily be grasped by an operator or mechanic, the guard rails 76, 78 prevent damage to the wire screen which might otherwise result from inadvertent contact with objects of a relatively inflexible nature.

It will be understood that the particular configuration of the cage assembly is obviously governed by the size and shape of the air intake duct with which it is to be used, as well as by the contour of the fuselage of the aircraft on which the unit is to be installed. For that reason the embodiment of the invention illustrated in the drawings is to be considered merely as illustrative of one particular structure embracing the concepts herein disclosed.

Obviously many modifications and variations of the present invention are possible in the light of the above teachings. It is therefore to be understood that within the scope of the appended claims the invention may be practiced otherwise than as specifically described.

I claim:

1. In an aircraft of the type powered by at least one engine incorporating a ram-air inlet: apparatus for precluding the entry of foreign objects into said inlet when said engine is operated under ground conditions, said apparatus comprising a skeletal framework in the form of a cage generally outlining a paraboloid and designed to fit over the rim of said ram-air inlet, said framework being made up of a plurality of annular structural members of varying diameters disposed in spaced-apart relation concentrically about the longitudinal axis of said framework; a plurality of generally parabolically-shaped structural members respectively lying in angularly-spaced relation, in planes which include said longitudinal axis, and intersecting each of said annular members; a generally semi-annular structural member intersecting at least a portion of said annular members and at least one of said parabolically-shaped members and terminating at each of said members at each such point of intersection, said generally semi-annular member having a configuration designed to conform to the surface contour of said aircraft when that annular structural member of said cage having the greatest diameter is fitted over the rim of the said ram-air inlet; a pair of fastening devices secured to the respective ends of said semi-annular structural member, each of said pair of fastening devices having a keyed projection adapted for respective insertion into an aligned opening formed in the surface of said aircraft when said cage is in fitted position; and a screen covering said framework, the mesh of said screen being such as to permit the passage of air therethrough to said engine but to preclude the entry into said duct of foreign objects, having a diameter exceeding the spacing between the interstices of said mesh, which are drawn to the surface of said screen when said engine is operated under ground conditions.

2. The combination of claim 1 further including at least one guard member in the form of a ring attached to and at least partially encircling said cage and being concentric with the said annular structural members, the said guard member being of greater diameter than said cage at the point of attachment and lying exterior of said screen, said guard member acting to protect said screen from damage due to inadvertent contact with proximate objects during selective installation and removal of said cage from its fitted position on said aircraft and also to facilitate the handling of said cage during such an installation or removal operation.

3. The combination of claim 1 in which each of said pair of fastening devices incorporates a camming member manually operable to a position where said cage is securely fitted to the rim of said ram-air inlet following insertion of said keyed projection into the aligned opening in the surface of said aircraft, and means for locking said camming member in such position.

4. The combination of claim 3 in which each of said pair of fastening devices further includes a tubular sleeve mounted on said semi-annular member, and a cylinder slidably carried within said sleeve, one end of said cylinder being keyed for insertion into the aligned opening in the surface of said aircraft.

5. The combination of claim 4 in which the said camming member is pivotally attached to the remaining end of said cylinder and is designed during operation to frictionally engage one end of said tubular sleeve.

6. Means for demountably attaching a screening device to the engine air intake duct of an aircraft to preclude entry into such duct of foreign objects when said engine is undergoing ground operation, said aircraft having at least one opening in the surface thereof intended to lockably receive a keyed member mounted on said screening device, a tubular sleeve rigidly secured to said screening device, a keyed member carried by said sleeve, said keyed member being in the form of a cylinder slidable within said sleeve and having a pin on one end thereof extending radially therefrom and adapted for insertion into the opening in the surface of said aircraft, and a manually-operable camming member pivotally carried on the other end of said cylinder for securing said screening device to the said engine air intake duct following lockable insertion of said pin into the opening in said aircraft surface.

7. The combination of claim 6 in which said camming member is provided with a plurality of apertures each of which is designed to receive a locking pin, and in which said cylinder is provided with an extending portion having at least one opening with which a selected one of the apertures in said camming member may be aligned, whereby insertion of said locking pin in said opening following the alignment therewith of one of said apertures will maintain said camming member in the position which it occupied at the time of such alignment.

8. In an aircraft powered by at least one engine utilizing air conveyed thereto through a forwardly-opening duct formed in the aircraft structure: apparatus for precluding the entry of foreign objects into said air duct when said engine is operated under ground conditions, said apparatus comprising a skeletal framework in the form of a cage designed to fit over the rim of said forwardly-opening air duct, a screen covering said framework, and at least one fastening member attached to said framework, said fastening member having a keyed projection adapted for insertion into an opening in said aircraft structure which is aligned with said projection when said cage is in fitted position, said fastening member incorporating manually-operable means for locking said cage in its fitted position following insertion of said keyed projection in the opening in said aircraft structure, said manually-operable means including a cam having a plurality of lockable positions and means for locking said cam in one of said positions.

References Cited in the file of this patent
UNITED STATES PATENTS 2,814,454     Atkins et al. _____ Nov. 26, 1957

FOREIGN PATENTS 495,430     Great Britain _____ Nov. 14, 1938